(12) United States Patent
Nakayasu et al.

(10) Patent No.: US 8,590,929 B2
(45) Date of Patent: Nov. 26, 2013

(54) GAS GENERATOR HAVING COMBUSTION CHAMBER INCLUDING CUSHION MEMBER

(75) Inventors: Masayuki Nakayasu, Hyogo (JP); Gen Kinoshita, Hyogo (JP)

(73) Assignee: Daicel Chemical Industries, Ltd., Osaka-Shi, Osaka (JP)

( * ) Notice: Subject to any disclaimer, the term of this patent is extended or adjusted under 35 U.S.C. 154(b) by 92 days.

(21) Appl. No.: 13/074,561

(22) Filed: Mar. 29, 2011

(65) Prior Publication Data

US 2011/0241324 A1    Oct. 6, 2011

Related U.S. Application Data

(60) Provisional application No. 61/319,136, filed on Mar. 30, 2010.

(30) Foreign Application Priority Data

Mar. 30, 2010    (JP) .................................. 2010-77021

(51) Int. Cl.
    *B60R 21/26*    (2011.01)
(52) U.S. Cl.
    USPC ............................ 280/741; 280/736; 102/530
(58) Field of Classification Search
    CPC ....................................................... C06D 5/00
    USPC .................... 102/530; 280/736, 741; 422/165
    See application file for complete search history.

(56) References Cited

U.S. PATENT DOCUMENTS

| | | | |
|---|---|---|---|
| 4,547,342 A | 10/1985 | Adams et al. | |
| 5,387,008 A * | 2/1995 | Lauritzen et al. | 280/741 |
| 5,398,966 A * | 3/1995 | Hock | 280/736 |
| 5,492,365 A | 2/1996 | Bayley et al. | |
| 5,625,164 A * | 4/1997 | McFarland et al. | 102/531 |
| 5,806,887 A | 9/1998 | Tanaka et al. | |
| 7,520,530 B2 * | 4/2009 | Yamazaki | 280/736 |
| 7,637,533 B2 * | 12/2009 | Yamazaki et al. | 280/736 |
| 2006/0119087 A1 * | 6/2006 | Blessing et al. | 280/736 |
| 2007/0075536 A1 * | 4/2007 | Kelley et al. | 280/737 |
| 2007/0182141 A1 * | 8/2007 | Yamazaki et al. | 280/741 |
| 2011/0241324 A1 * | 10/2011 | Nakayasu et al. | 280/736 |
| 2012/0038139 A1 * | 2/2012 | Borg et al. | 280/741 |

FOREIGN PATENT DOCUMENTS

| | | |
|---|---|---|
| EP | 1661775 A1 | 5/2006 |
| JP | 2010-892 A | 1/2010 |
| WO | WO 95/31356 A1 | 11/1995 |

* cited by examiner

*Primary Examiner* — Karen Beck
(74) *Attorney, Agent, or Firm* — Birch, Stewart, Kolasch & Birch, LLP

(57) ABSTRACT

The present invention provides a gas generator for a restraining apparatus of a vehicle, including a combustion chamber, a tabular cushion member being disposed on a bottom portion of the combustion chamber, the solid gas generating agent as a gas generating source, being charged in the combustion chamber inside the gas generator together with the cushion member, the combustion chamber being substantially in a cup shape in which an inner diameter ($D_1$) of an opening is smaller than an inner diameter ($D_2$) of the bottom portion, the cushion member including a circular portion serving as a base part and a plurality of protrusions protruding from a peripheral edge of the circular portion, an outer diameter ($d_1$) of the circular portion and the inner diameter ($D_1$) of the opening satisfying a relationship of $d_1 < D_1$, and an outer diameter ($d_2$) including the protrusions satisfying relationships of $d_2 > D_1$ and $d_2 \leq D_2$.

6 Claims, 4 Drawing Sheets

GAS GENERATOR HAVING COMBUSTION CHAMBER INCLUDING CUSHION MEMBER

This nonprovisional application claims priority under 35 U.S.C. §119(a) to Patent Application No. 2010-77021 filed in Japan on 30 Mar. 2010 and 35 U.S.C. §119(e) to U.S. Provisional Application No. 61/319,136 filed on 30 Mar. 2010, both of which are incorporated by reference.

BACKGROUND OF THE INVENTION

1. Field of the Invention

The present invention relates to a gas generator for use in a restraining apparatus to be mounted in a vehicle and the like.

2. Description of Related Art

In a gas generator that uses a solid gas generating agent, a solid gas generating agent of various shapes such as granular, pellet form and disk shape is charged in a combustion chamber and combustion gas for actuation is generated by igniting and burning the gas generating agent with an ignition device. The gas generating agent is charged in the combustion chamber formed within a housing of the gas generator and retained until actuation, and it is necessary to prevent the solid gas generating agent from becoming powdered due to external vibration while being mounted in a vehicle or the like.

In a conventional gas generator, in order not to pulverize the gas generating agent, a cushion member is disposed inside the combustion chamber to absorb vibrations and alleviate impact on the gas generating agents.

FIG. 3 of U.S. Pat. No. 5,492,365 discloses a gas generator 14 in which one end of a elongated housing 50 is closed by an end wall 54, and a squib 170 fixed to a closure cap 56 is attached to an opening on the opposite end. A gas generating material body 60 arranged in the combustion chamber 64 is retained with a pad 122 placed at the end wall 54. Since the pad 122 has approximately the same cross section shape as the cross section shape of the combustion chamber 64, the operation of disposing the pad 122 is easy.

Nevertheless, if the cushion member is larger than the opening of the combustion chamber, the operation of disposing the cushion member is not easy.

For example, in a gas generator 10 shown in FIG. 1 of JP-A No. 2010-000892, a second cup member 41 defining a second combustion chamber 35 has an opening 41a whose inner diameter is considerably smaller than the inner diameter of a bottom portion 41b where the cushion member is to be disposed. In this case, it is difficult to place a cushion member of a size capable of covering the bottom portion 41b from the opening 41a.

A disk-shaped material made of plastic foam or rubber is used as the cushion member, but when giving consideration to the workability upon disposing the cushion member on the bottom, the cushion member desirably possesses a certain level of shape-retention property (strength of a level capable of maintaining a given shape). However, in the foregoing case, it is more difficult to place the cushion member through a small opening 41a. Although a disk-shaped cushion member can be placed with folding it in two, here, the operation of unfolding the inserted cushion member and positioning it to match the shape of the bottom portion 41b becomes complicated. In addition, it is impossible to completely eliminate the possibility that the small pieces, which are produced when the cushion member and the second cup member 41 come in contact, cause unanticipated problems in the manufacture process or product quality.

SUMMARY OF THE INVENTION

The present invention provides a gas generator having a combustion chamber including a cushion member. In details the invention provides a gas generator for a restraining apparatus of a vehicle, including:

a combustion chamber, a tabular cushion member being disposed on a bottom portion of the combustion chamber, a solid gas generating agent as a gas generating source, being charged in the combustion chamber inside the gas generator together with the cushion member, the combustion chamber being substantially in a cup shape in which an inner diameter ($D_1$) of an opening is smaller than an inner diameter ($D_2$) of the bottom portion, the cushion member including a circular portion serving as a base part and a plurality of protrusions protruding from a peripheral edge of the circular portion, an outer diameter ($d_1$) of the circular portion and the inner diameter ($D_1$) of the opening satisfying a relationship of $d_1 < D_1$, and an outer diameter ($d_2$) including the protrusions satisfying relationships of $d_2 > D_1$ and $d_2 \leq D_2$.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 is, in (b), an explanatory diagram of the method of disposing the cushion member in (a) of FIG. 2;

FIG. 3 is, in (b), an explanatory diagram of the method of disposing the cushion member in (a) of FIG. 3;

DETAILED DESCRIPTION OF THE INVENTION

Figure 1:
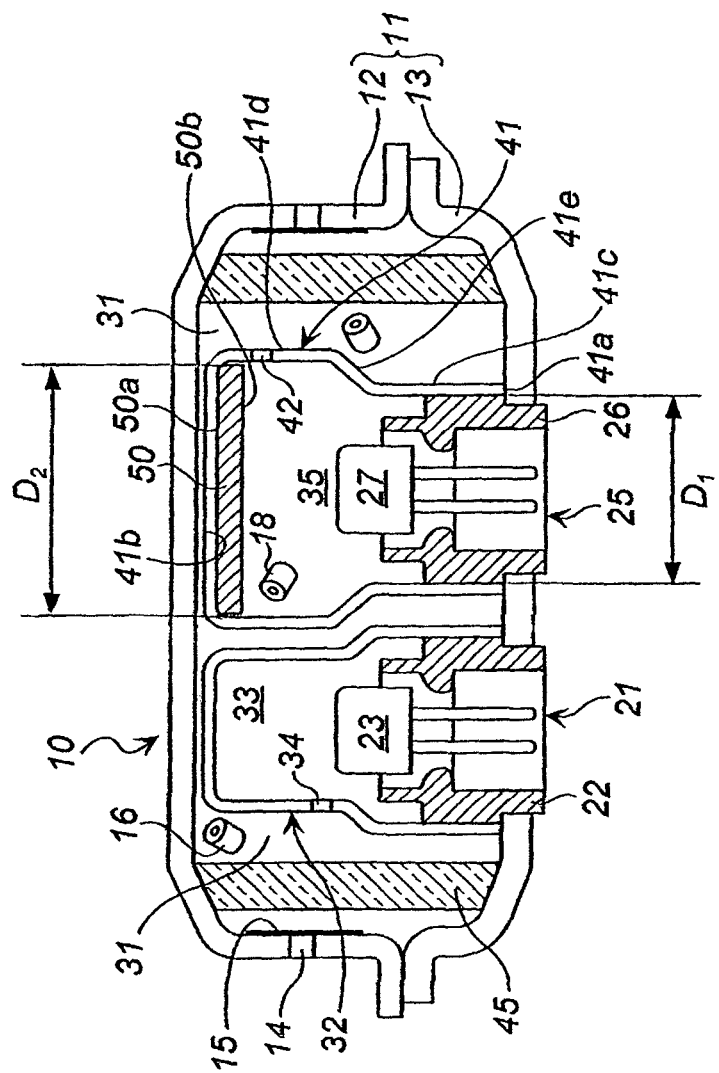
FIG. 1 shows a sectional view, in the axial direction, of a gas generator according to the present invention.

The present invention provides a gas generator in which a cushion member is disposed on the bottom of a combustion chamber defined by a container such as a second cup member 41 in the shape shown in FIG. 1 of JP-A No. 2010-000892 and a solid gas generating agent is charged.

The present invention provides a cushion member used in a gas generator including a solid gas generating agent. More specifically, the present invention provides a cushion member disposed in a cup which forms a space to be charged with the solid gas generating agent, as well as a gas generator using the cushion member. In the present invention, an inner diameter of an opening of the cup is smaller than an inner diameter of a bottom portion of the cup, and the cushion member is disposed at the bottom portion of the cup.

And, the cup is usable in various kinds of gas generators employed in a restraining apparatus for an vehicle, such as a gas generator for an air bag or a gas generator for a seat-belt pretensioner. The cup may be disposed inside the housing of the gas generator, or the cup itself may be used as a housing (an outer container forming the gas generator).

Therefore, the present invention is applicable to any gas generator using a solid gas generating agent, such as a pyrotechnic gas generator in which gas is produced by combustion of a solid gas generating agent, or a hybrid gas generator using both of a solid gas generating agent and a pressurized gas.

The gas generator of the present invention preferably has a housing or a combustion chamber, a gas source and a cushion member, further optionally including an initiator, a filter and a discharge port.

The present invention includes the following preferable embodiments (2), (3) and (4):

(2) a gas generator according to the above shown invention, wherein the cushion member is a regular polygon, and a maximum distance between opposing sides is the $d_1$, and a distance between two opposing apexes or corners is the $d_2$;

(3) a gas generator according to the above shown invention, wherein the cushion member is a regular polygon, all sides of the regular polygon are formed of curved lines curved inward, and a distance between intermediate points of opposing sides is the $d_1$, and a distance between apexes or corners of two opposing apexes is the $d_2$; and (4) a gas generator according to the above shown invention, wherein a width of a concave portion formed by a difference between the inner diameter ($D_2$) of a bottom surface portion and the outer diameter ($d_1$) of the circular portion corresponds to a gap which the solid gas generating does not enter.

In the invention, the combustion chamber is substantially in a cup shape in which an inner diameter ($D_1$) of an opening is smaller than an inner diameter ($D_2$) of a bottom surface portion. The above-stated combustion chamber includes, in scope, the second cup member 41 defining the second combustion chamber 35 of the gas generator 10 shown in FIG. 1 of JP-A No. 2010-000892, except for the cushion member.

In the invention, then, the cushion member, disposed on the bottom portion of the combustion chamber, includes a circular portion serving as a base part and a plurality of protrusions protruding from a peripheral edge of the circular portion; an outer diameter ($d_1$) of the circular portion and the inner diameter ($D_1$) of the opening satisfy a relationship of $d_1 > D_1$; and an outer diameter ($d_2$) of the opening satisfies including the protrusions satisfies relationships of $d_2 > D_1$ and $d_2 \leq D_2$, so that the invention facilitates the workability upon disposing the cushion member inside the combustion chamber.

As described above, the cushion member includes a circular portion serving as the base part, and a plurality of protrusions protruding from a peripheral edge of the circular portion. A total of 3 to 10, preferably 4 to 8 protrusions are formed as the protrusions, and these protrusions are preferably arranged to be symmetrical relative to the center of the circular portion.

The cushion member may be in the shape of a regular polygon, preferably in a shape of a regular hexagon or a regular octagon. In addition, a regular tetragon can be used, and a regular pentagon with an odd number of apexes can be used.

The gas generator of the present invention includes a combustion chamber having a small opening and a large bottom portion, and a cushion member capable of substantially covering the bottom is disposed, so that influence on the gas generating agents caused by external vibrations and impact is alleviated.

EMBODIMENT OF THE INVENTION

The present invention will be explained with reference to the embodiments shown in the drawings. FIG. 1 shows a sectional view, in the axial direction, of the gas generator for an air bag according to the present invention. A structure of second combustion chamber cup is preferably a second cup member 41 shown in FIG. 1 of JP-A No. 2010-000892 except for the cushion member.

The gas generator 10 includes a housing 11 formed by a diffuser shell 12 and a closure shell 13, and a plurality of gas discharge ports 14 are formed on the peripheral surface of the diffuser shell 12. The gas discharge ports 14 are blocked from the inside with a seal tape 15 before actuation.

Two holes are provided to the bottom surface of the closure shell 13, and a first igniting device 21 and a second igniting device 25 are mounted, respectively, to these holes by a known method. The first igniting device 21 has a first igniter collar 22 and a first igniter 23, and the second igniting device 25 has a second igniter collar 26 and a second igniter 27.

A cylindrical filter 45 is disposed inside the housing 11, and a first combustion chamber 31 is defined inside the filter. Inside the first combustion chamber 31, a first gas generating agent (gas generating agent of a known composition) 16 is charged and a cup member 32 defining a transfer charge chamber 33 is also disposed.

The transfer charge chamber 33 is charged with a conventional transfer charge or a conventional gas generating agent (not shown in the drawing). The first combustion chamber 31 and the transfer charge chamber 33 are in communication via a first communication hole 34.

Further inside the first combustion chamber 31, a second combustion chamber cup 41 is disposed, and the second combustion chamber 35 is defined therein.

In the second combustion chamber cup 41, one end is opened (an opening 41a), and the opposite end is closed (a bottom portion 41b). A reduced-diameter portion 41c is formed in the opening 41a side, an enlarged-diameter portion 41d is formed in the bottom portion 41b side, and a circular slant surface 41e is formed in the boundary part between the reduced-diameter portion 41c and the enlarged-diameter portion 41d).

The inner diameter $D_1$ of the opening 41a and the inner diameter $D_2$ of the bottom portion 41b is $D_1 > D_2$, and $D_2/D_1$ is within a range of more than 1 and less than 3, preferably more than 1 and less than 2. In FIG. 1, $D_2/D_1 = 1.5$.

The second combustion chamber cup 41 is fitted into a second igniter collar 26 so as to cover a second igniter 27 from the opening 41a side. The thickness of the second combustion chamber cup 41 is uniform.

In the second combustion chamber 35, a disk-shaped cushion member 50 is disposed and a second gas generating agent in a single-perforated shape (gas generating agent of a known composition) 18 is charged. One face 50a of the cushion member 50 abuts against the bottom portion 41b, and another face 50b abuts against the second gas generating agent 18.

The cushion member 50 has shape-retention property and elasticity.

The shape-retention property referred to herein are shape-retention property of a level where, for example, when one end of the cushion member is held by fingertips (or held and fixed with a clamp), the material will not deform due to its own weight and can maintain a disk shape. The thickness will depend on the material but will suffice as long as it is possible to maintain the foregoing shape-retention property, and, for example, the thickness may be about 1 to 8 mm.

The elasticity referred to herein is the elasticity of a level where, for example, even when the material is folded in two, the material is able to promptly return to its original shape.

The cushion member 50 can be made of various known plastic foams such as silicone foam, polyurethane foam, polystyrene foam, or rubbers.

The cushion member 50 shown in FIG. 1 will be explained with reference to FIG. 2(a). FIG. 2(a) is a diagram showing a state when the cushion member 50 is disposed in the second combustion chamber 35 (the second combustion chamber cup 41), being seen from the opening 41a side. For ease of understanding, some components are not shown.

The cushion member 50 includes a circular portion 51 as the base part, and a plurality of protrusions 52 (52a to 52d) protruding from the peripheral edge of the circular portion 51 outwardly in the radial direction. The protrusions 52a, 52c are positioned opposite to each other and form a pair, and the protrusions 52b, 52d are positioned opposite to each other and form a pair.

The outer diameter $d_1$ of the circular portion 51 satisfies the relationship of $d_1 < D_1$ with the inner diameter $D_1$ of the opening.

A distance $d_2$ (a diameter of the circle connecting the apexes of the respective protrusions) between the apexes of the protrusions 52a, 52c (and the protrusions 52b, 52d) satisfies the relationships of $d_2 > D_1$ and $d_2 \leq D_2$. Note that, even when it is $d_2 < D_2$, $d_2$ is only slightly shorter than $D_2$ (for example, by 0.1 to 2.0 mm).

A width (w) of a concave portion 60 formed by the difference between the inner diameter ($D_2$) of the bottom portion 41b of the second combustion chamber cup 41 and the outer diameter ($d_1$) of the circular portion 51 corresponds to a gap which the second gas generating agent 18 does not enter.

The method of disposing the cushion member 50 shown in FIG. 2(a) into the second combustion chamber cup 41 shown in FIG. 1 will be explained with reference to FIG. 2(b).

Since the outer diameter $d_1$ of the circular portion 51 of the cushion member 50 is smaller than the inner diameter $D_1$ of the opening 41a of the second combustion chamber cup 41, even when placing the cushion member 50 through the opening 41a, the workability will not be impaired because the peripheral edge of the circular portion 51 does not come in contact with the opening 41a.

Since the length $d_2$ from the protrusion 52a to the protrusion 52c (52b and 52d) of the cushion member 50 is greater than the inner diameter $D_1$ of the opening 41a, when the cushion member 50 is placed through the opening 41a, the four protrusions 52a to 52d come in contact with the opening 41a.

Figure 2:
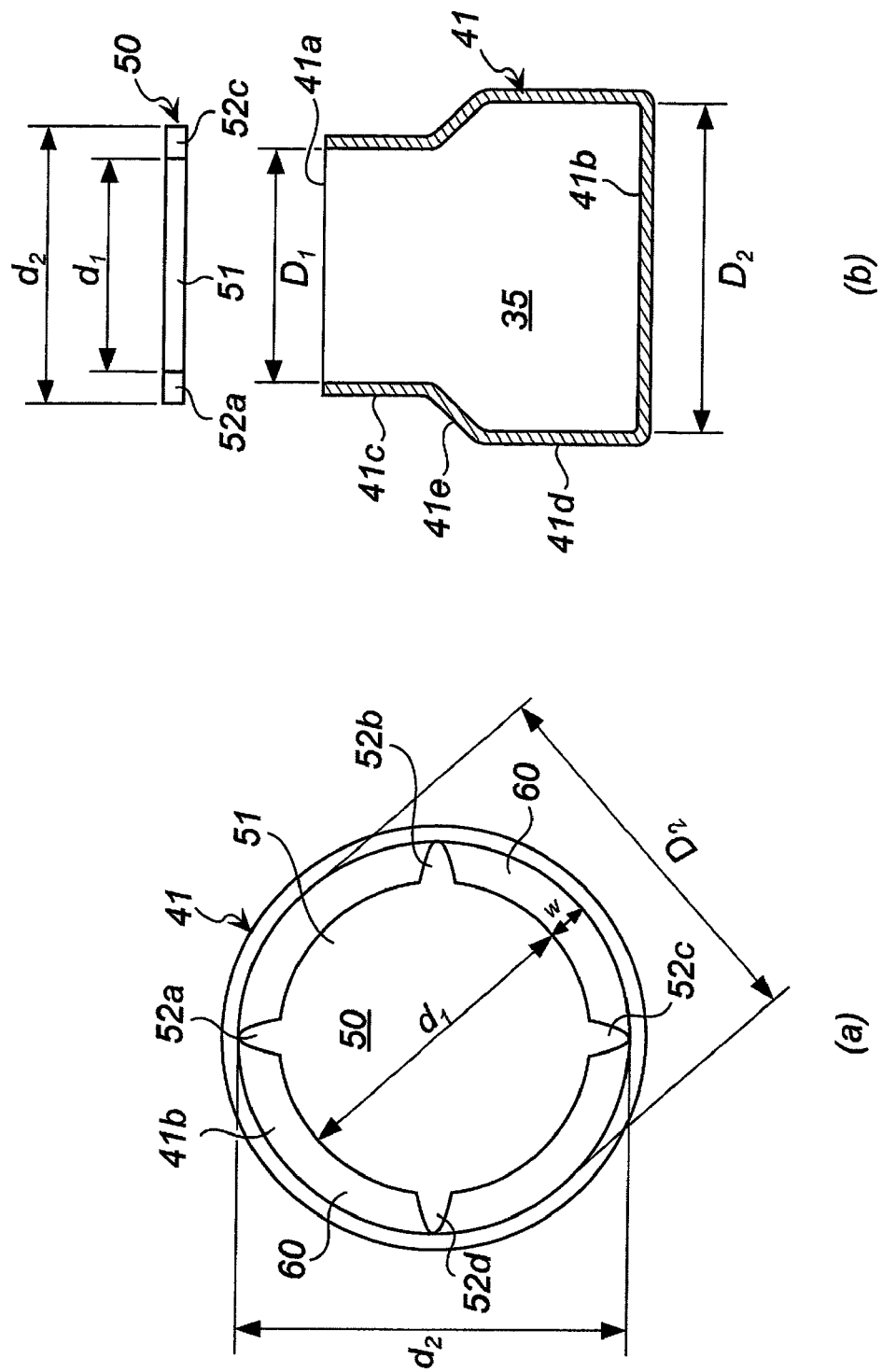
FIG. 2 is, in (a), an explanatory diagram of the layout of the cushion member used in the gas generator in FIG. 1.

Nevertheless, since the cushion member 50 possesses the elasticity described above and the contact area of the four protrusions 52a to 52d and the opening 41a is small (area of interference is small), the cushion member 50 passes through the reduced-diameter portion 41c with the four protrusions 52a to 52d in a deformed state, thereafter reach the bottom portion 41b, and are returned to their original shape, and become the state shown in FIG. 2 (a).

In this state, the tips of the protrusions 52 abut against the inner circumferential surface of the second combustion chamber cup 41 (the expanded-diameter portion 41d), and the positioning of the cushion member 50 is thereby achieved. Moreover, since the contact area of the cushion member 50 and the second combustion chamber cup 41 is small, even if the cushion member 50 is folded in two and inserted, it can be easily disposed on the bottom portion 41b by unfolding it inside the second combustion chamber 35.

When using a disk-shaped cushion member (without protrusions) with an outer diameter of d2 in substitute for the cushion member 50, since the contact area with the opening 41a becomes larger, the operation of placing the foregoing cushion member into the second combustion chamber cup 41 becomes extremely difficult. Here, if a cushion member with inferior shape-retention property (that is, easily deformable) is used, it can be easily placed in the second combustion chamber cup 41 while being folded, but it becomes difficult to unfold such a cushion member on the bottom portion 41b. Moreover, since the contact area with the inner circumferential surface of the second combustion chamber cup 41 increases and generates friction, it becomes difficult to position the cushion member coaxially with the bottom portion 41b.

A cushion member 150 according to another embodiment will be explained with reference to FIG. 3(a).

The cushion member 150 is in a shape of a regular hexagon, and six apexes 150a to 150f corresponding to the above protrusions come into internal contact with the bottom portion 41b (the inner circumferential surface of the expanded-diameter portion 41d). A distance (a diameter of the circle connecting the intermediate points of the respective sides) of opposing sides is $d_1$, and a distance between the apexes of two opposing apexes (for example, 150a and 150d) is $d_2$ (a diameter of the circle connecting the apexes of the respective apexes).

Next, the method of disposing the cushion member 150 shown in FIG. 3(a) into the second combustion chamber cup 41 shown in FIG. 1 will be explained with reference to FIG. 3(b).

The cushion member 150 shown in FIG. 3(a) is inserted into the second combustion chamber cup 41 so that, as shown in FIG. 3(b), one of its apexes (for example, 150d) faces the bottom portion 41b (so that the side between the apexes 150b and 150c and the side between the apexes 150e and 150f face the inner circumferential surface of the reduced-diameter portion 41c). Here, since the length of $d_1$ is smaller than the inner diameter $D_1$ of the opening 41a, the cushion member 150 can be easily placed into the second combustion chamber cup 41 without impairing the workability because the cushion member 150 does not come in contact with the opening 41a and the reduced-diameter portion 41c. In addition, the cushion member 150 can also be disposed as shown in FIG. 2(b).

A cushion member 250 according to another embodiment will be explained with reference to FIG. 4. The cushion member 250 is shaped such that the respective sides of the regular hexagon cushion member 150 shown in FIG. 3(a) are formed of curved lines curved inward. A distance between the intermediate points of the opposing sides is $d_1$, and a distance between the apexes of the two opposing apexes is the $d_2$ (a diameter of the circle connecting the apexes of the six apexes).

Since the cushion member 250 is formed such that its respective sides are formed of curved lines curved inward, it becomes more difficult to come in contact with the opening 41a of the second combustion chamber cup 41.

Next, the gas generator shown in FIG. 5 will be explained.

Figure 5:
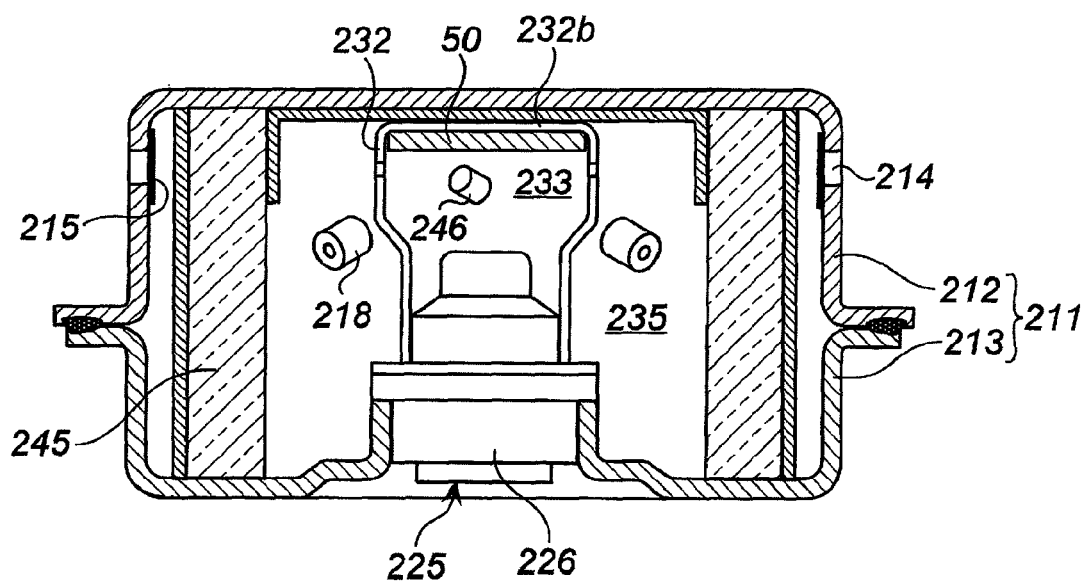
FIG. 5 shows a sectional view, in the axial direction, of a gas generator according to another embodiment.

With the gas generator shown in FIG. 5, an igniter 225 disposed in the center hole of a closure shell 213 of a gas generator housing 211 is disposed coaxially with the central axis of the housing 211. The igniter 225 is mounted on a collar 226.

A plurality of gas discharging holes 214 are formed on a circumferential wall portion of a diffuser shell 212, and blocked with a seal tape 215.

A filter 245 defining a combustion chamber 235 is disposed inside the housing 211, and a gas generating agent 218 is charged therein. The igniter 225 is covered with a transfer charge chamber cup 232. The shape of the transfer charge chamber cup 232 is the same as the shape of the second combustion chamber cup 41 shown in FIG. 1.

Figure 3:
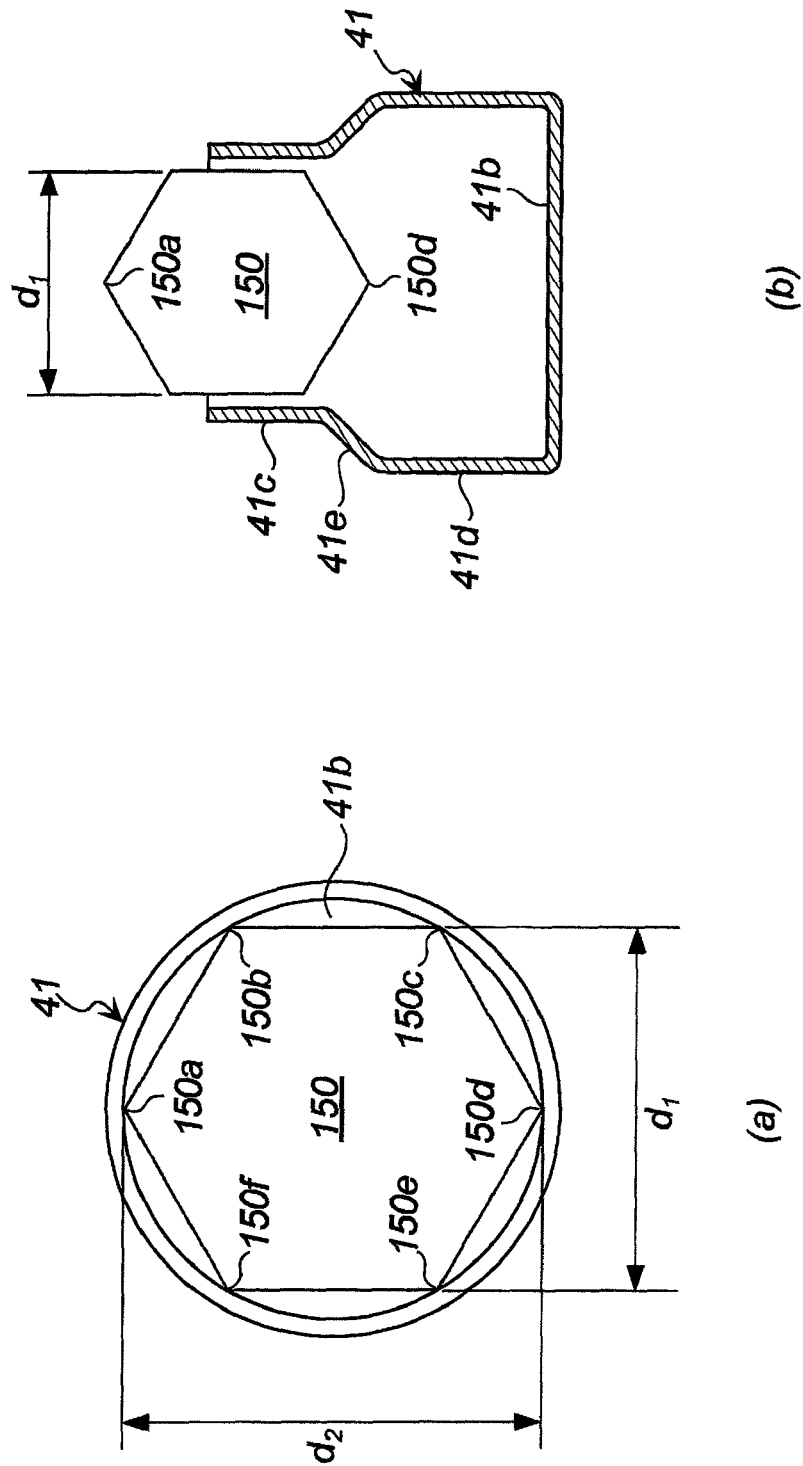
FIG. 3 is, in (a), an explanatory diagram of the layout of the cushion member that can be used in the gas generator in FIG. 1.
Figure 4:
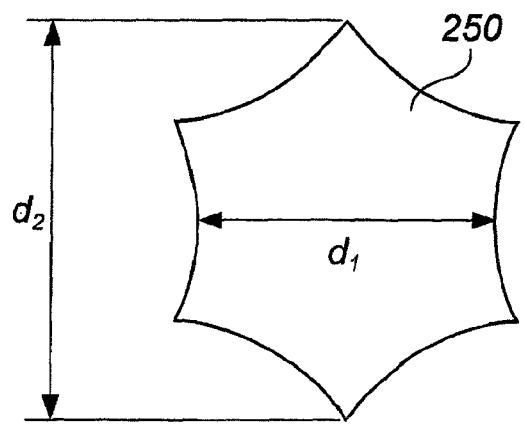
FIG. 4 shows a plan view of the cushion member according to another embodiment.

The inside of the transfer charge chamber cup 232 is the ignition chamber 233, and the cushion member shown in FIG. 2(*a*), FIG. 3(*a*) and FIG. 4 (shown as 50 in FIG. 5) is disposed therein, and a transfer charge of a known composition, or a gas generating agent 246 that functions as the transfer charge is charged therein.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining apparatus of a vehicle, comprising:
    a combustion chamber;
    a tabular cushion member being disposed on a bottom portion of the combustion chamber;
    a solid gas generating agent as a gas generating source, being charged in the combustion chamber inside the gas generator together with the cushion member;
    the combustion chamber being substantially in a cup shape in which an inner diameter (D1) of an opening is smaller than an inner diameter (D2) of the bottom portion;
    the cushion member including a circular portion serving as a base part and a plurality of protrusions protruding from a peripheral edge of the circular portion;
    an outer diameter (d1) of the circular portion and the inner diameter (D1) of the opening satisfying a relationship of d1<D1; and
    an outer diameter (d2) including the protrusions satisfying relationships of d2>D1 and D2<D2.

2. A gas generator for a restraining apparatus of a vehicle, comprising:
    a combustion chamber;
    a cushion member being disposed on a bottom portion of the combustion chamber;
    a solid gas generating agent as a gas generating source, being charged in the combustion chamber inside the gas generator together with the cushion member;
    the combustion chamber being substantially in a cup shape in which an inner diameter (D1) of an opening is smaller than an inner diameter (D2) of the bottom portion; and
    the cushion member having a shape of a regular polygon, a maximum distance between opposing sides of the regular polygon being d1, a distance between two opposing apexes of the regular polygon being d2, and satisfying a relationship of d1<D1, and a relationship of d2>D1 and d2≤D2.

3. A gas generator for a restraining apparatus of a vehicle, comprising:
    a combustion chamber;
    a cushion member being disposed on a bottom portion of the combustion chamber;
    a solid gas generating agent as a gas generating source, being charged in the combustion chamber inside the gas generator together with the cushion member;
    the combustion chamber being substantially in a cup shape in which an inner diameter (D1) of an opening is smaller than an inner diameter (D2) of the bottom portion; and
    the cushion member having a plurality of opposing sides, wherein all sides of the cushion member are formed of curved lines curved inward, and a distance between intermediate points of the opposing sides is d1, and a distance between two opposing apexes is d2, and satisfies a relationship of d1<D1 and a relationship of d2>D1 and d2≤D2.

4. A gas generator according to claim 1,
    wherein a width of a concave portion formed by a difference between the inner diameter (D2) of a bottom surface portion and the outer diameter (d1) of the circular portion corresponds to a gap which the solid gas generating does not enter.

5. A gas generator according to claim 2,
    wherein a width of a concave portion formed by a difference between the inner diameter (D2) of a bottom surface portion and the maximum distance (d1) corresponds to a gap which the solid gas generating does not enter.

6. A gas generator according to claim 3,
    wherein a width of a concave portion formed by a difference between the inner diameter (D2) of a bottom surface portion and the distance (d1) corresponds to a gap which the solid gas generating does not enter.

* * * * *